May 30, 1950

G. E. DUNN 2,509,969

CONSTANT VELOCITY JOINT

Filed Dec. 29, 1944

INVENTOR.
George E. Dunn.
BY
Harness, Dickey & Pierce.
ATTORNEYS.

May 30, 1950

G. E. DUNN 2,509,969

CONSTANT VELOCITY JOINT

Filed Dec. 29, 1944

INVENTOR.
George E. Dunn.
BY
Harness, Dickey & Pierce.
ATTORNEYS.

May 30, 1950 G. E. DUNN 2,509,969
CONSTANT VELOCITY JOINT
Filed Dec. 29, 1944 3 Sheets-Sheet 3
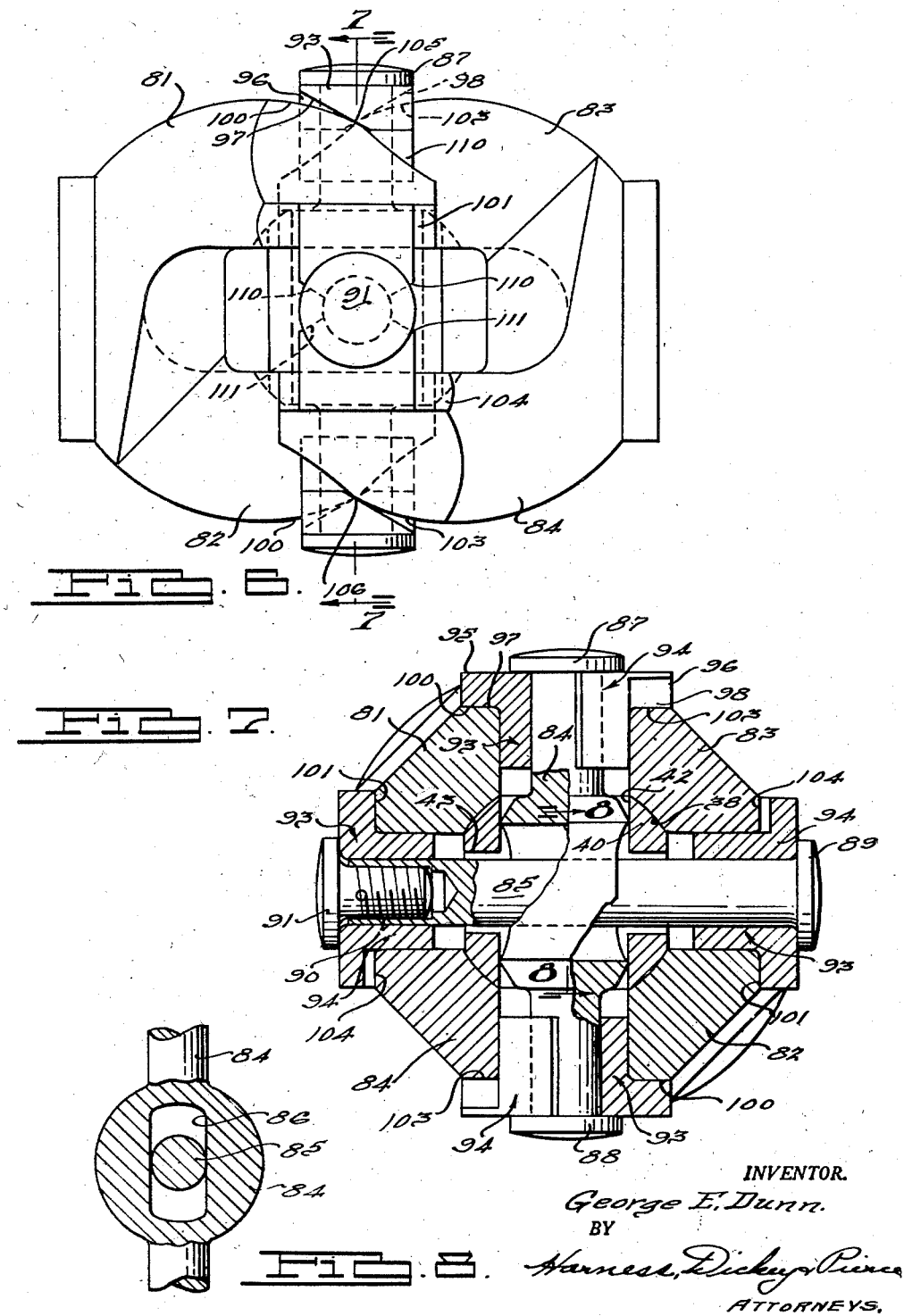
INVENTOR.
George E. Dunn.
BY
Harness, Dickey & Pierce
ATTORNEYS.

Patented May 30, 1950

2,509,969

UNITED STATES PATENT OFFICE 2,509,969

CONSTANT VELOCITY JOINT

George E. Dunn, Dearborn, Mich., assignor to Universal Products Company Incorporated, Dearborn, Mich., a corporation of Delaware Application December 29, 1944, Serial No. 570,233

6 Claims. (Cl. 64—21)

The invention relates to universal joints and it has particular relation to a universal joint of the constant velocity type.

In certain respects the invention relates to the type of constant velocity joint embodied in the copending application for patent of Richard B. Ransom, Serial No. 480,490, filed March 25, 1943 now Patent 2,396,750, issued March 1946. In that application for patent the joint generally comprises a pair of yokes having their arms disposed in 90° spaced relation so as to provide axially arranged slots between adjacent arms, and a cross having its trunnions projecting outwardly into the slots, respectively. This cross comprises two diametrically extending trunnion elements which are so connected at their centers that they stay in the same plane while permitting movement of either trunnion element along its own axis relative to the other trunnion element, and also movement of the two trunnion elements in scissors fashion. Movement of the two trunnion elements into the bisecting plane is effected by collar or roller elements on the outer ends of the trunnions which have such contact with the outer surfaces of the arms that when either yoke is angled relative to the other, the cross is shifted into the bisecting plane. The present invention is concerned principally with improvements in the centering of the joint or rather with the holding of the yokes on a fixed joint center located at the intersection of the two shaft axes and means for shifting of the cross into the bisecting plane.

One object of the present invention is to provide an improved constant velocity joint of the general character indicated wherein improved means are provided for centering the yokes and locating the center of the joint, which is of such design that the yokes, cross, and centering means may be easily assembled.

Another object of this invention is to provide a constant velocity joint such as mentioned wherein the centering means co-operates with the cross so as to hold the latter against movement axially of either shaft axis.

Another object of the invention is to provide an improved centering means for this type of joint which is contained within the joint and therefore which is independent of any spherical housings such as have been employed for centering universal joints.

Another object of the invention is to provide an improved centering means for the type of joint previously mentioned which will enable using bisecting means having tangential contact with the outer surfaces of the yoke arms.

Another object of the invention is to provide an improved bisector means for shifting the cross into the angle bisecting position which lessens the strain on the bisector.

Other objects of the invention will become apparent from the following specification, from the drawings relating thereto, and from the claims hereinafter set forth.

For a better understanding of the invention, reference may be had to the drawings, wherein:

Fig. 6 is a view similar to Fig. 1 illustrating a joint constructed according to another form of the invention;

Fig. 7 is a cross-sectional view taken substantially along the line 7—7 of Fig. 6;

Fig. 8 is a cross-sectional view taken substantially along line 8—8 of Fig. 7.

Figure 2:
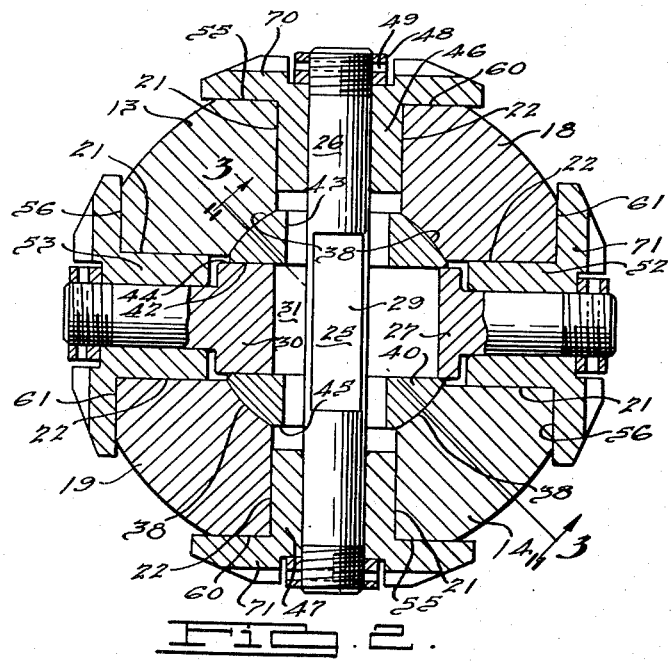
Fig. 2 is a cross-sectional view taken substantially along the line 2—2 of Fig. 1.
Figure 4:
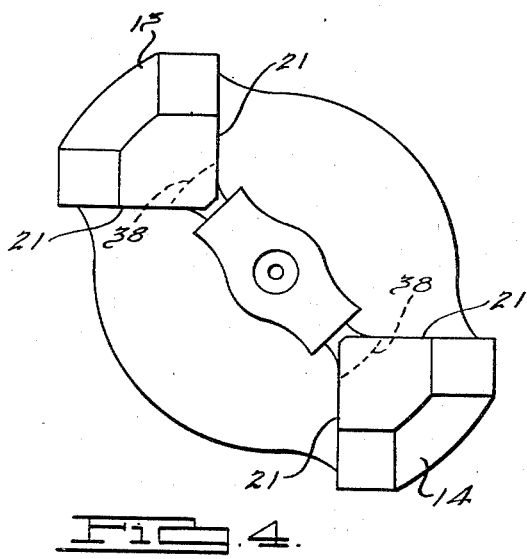
Fig. 4 is an end view of one of the yoke arms.

Referring to the several figures, the joint illustrated includes a shaft 11 having a yoke 12 provided with yoke arms 13 and 14. A second shaft 16 includes a yoke 17 having arms 18 and 19. As best shown by Figs. 2 and 4, the adjacent sides of each pair of adjacent arms, as for instance the arms 13 and 18, have spaced side faces 21 and 22, respectively, each of which is parallel to its yoke axis. Hence, each pair of surfaces 21 and 22 defines an axial guideway or slot between each pair of yoke arms.

Figure 5:
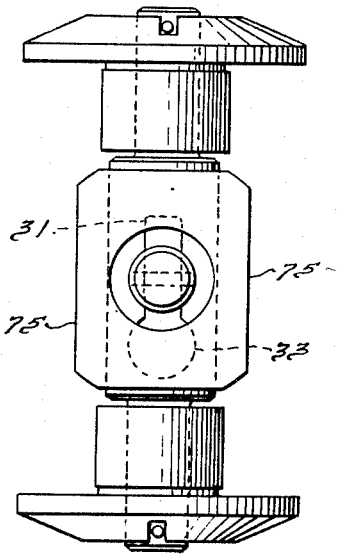
Fig. 5 is a detail view illustrating the manner in which the two trunnion elements and centering spherical element are connected.

A cross, generally indicated at 25, interconnects the two yokes, and, as best shown in Fig. 2, it includes two oppositely arranged trunnion elements 26 and 27. The element 26 is round throughout its length, excepting for a portion 29 at its center which is flattened at diametrically opposite sides, and the rounded end portions of the element constitute trunnions located in opposed slots between the yoke arms 13 and 18 and the arms 14 and 19. The element 27 has rounded end portions providing trunnions in the other slots, but it is enlarged at its center as indicated at 30, and this enlarged portion has a diametrically extending slot 31 which snugly but movably receives the flattened center portion 29 of the other trunnion element. It is evident from this that the two trunnion elements can shift in radial directions and swing in scissors fashion while being maintained in the same plane by the contacts between the flattened portion on one trunnion element and opposed flat sides of the slot 31 in the other. In this connection and referring to Fig. 5 in particular, it will be noted that the slot 31 at one end is enlarged as indicated at 33 to permit assembly of the two trunnion elements. It should be evident that the trunnion element 26 can be inserted through the enlarged end 33 of the slot until the flattened portion is substantially centered relative to the other trunnion element and then the flattened portion can be shifted into the narrower portion of the slot.

Figure 3:
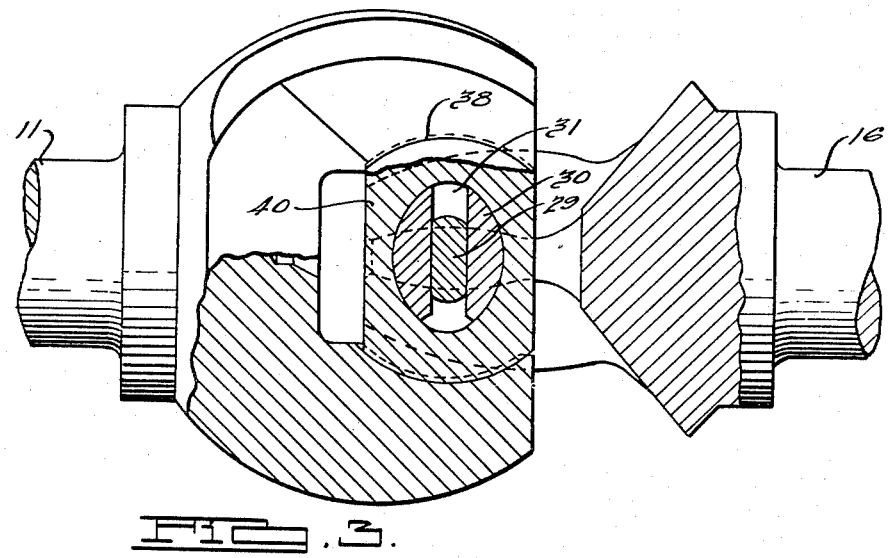
Fig. 3 is a cross-sectional view taken substantially along the line 3—3 of Fig. 2.

For the purpose of centering the joint, the inner side of each yoke arm is shaped to provide a spherical segment such as indicated at 38, and these segments have the same radius of curvature. A spherical or ball centering and holding element 40 fits within the spherical segments 38 on all of the yoke arms, and it will be noted in Fig. 3 particularly that the spherical segments or surfaces 38 on the arms have such contact with the spherical element that when once in place, axial movement of either shaft or yoke relative to the other is prevented. Through a side range of shaft movement, the spherical element 30 acts as a ball upon which both yokes swing, and the spherical contact between the arms and the ball element is such that the yoke elements are held against any kind of movement except swinging about the center of the ball.

As best seen in Fig. 2, the ball has a transverse bore 42 which closely but slidably receives the enlarged portion 30 of the trunnion element 27, and a second and transverse bore 43 through which the second trunnion element extends. The bore 42, as has been stated, closely fits the enlarged portion 30 on the trunnion element 27, but the bore 43 is substantially larger than the trunnion element 26, and from this it will be apparent that the trunnion element 26 may swing in scissors relation to the other trunnion element, since the bore 43 will permit at least a desired amount of scissors movement. At the same time, the bore 43 is not of such diameter as to permit undesirable movement of the ball element 40 about the axis of the trunnion element 27, and it will be evident that if a certain amount of movement of the spherical element about the trunnion element 27 occurs, the side of the bore 43 will contact the trunnion element 26. It is to be noted that the ball element at each end of bore 42 has flattened sides 44 and that similar flattened sides 45 are provided at the ends of bore 43.

The oposed ends of the trunnion element 26 have rollers 46 and 47 thereon which closely but movably fit the slots between the yoke arms, and the rollers are retained against outward movement of the trunnion element by nuts 48 engaging outer threaded ends on the trunnion element. Locking pins 49 extending diametrically through openings in the nuts 48 and through the ends of the trunnion element hold the parts in assembled relation. Similarly rollers 52 and 53 are provided on the outer ends of the trunnion element 27 and in the slots between the yoke arms.

Figure 1:
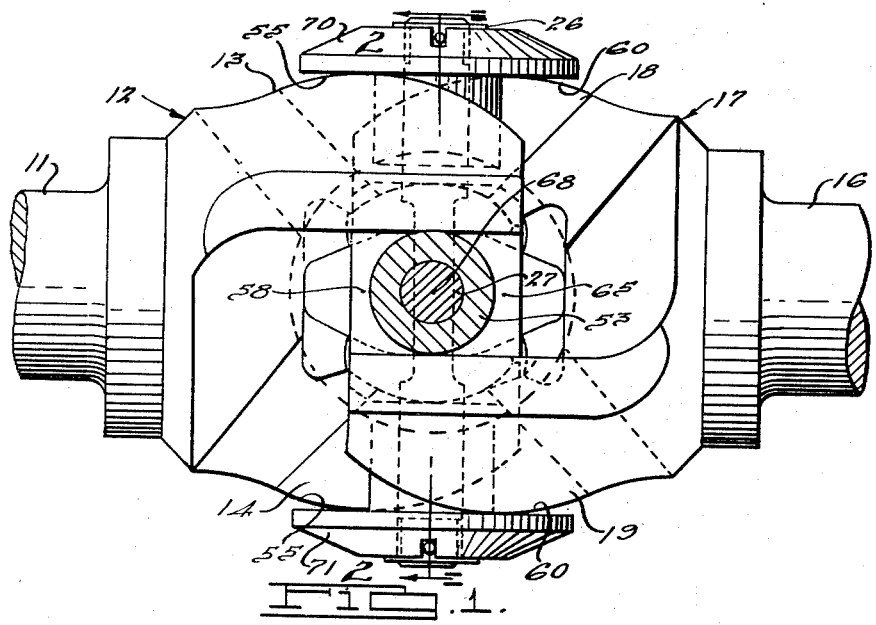
Fig. 1 is an elevational view of a constant velocity joint constructed according to one form of the invention.

For effecting movement of the cross into angle bisecting position, the two yoke arms 13 and 14 have outer cylindrical surfaces 55 and 56, and these surfaces have an axis of curvature which intersects the axis of shaft 11 at the point indicated at 58 in Fig. 1. The surfaces 55 are parallel and the surfaces 56 are parallel, but the axes of the two pairs of surfaces cross each other in 90° relation while passing through the point 58. The yoke arms 18 and 19 respectively have cylindrical surfaces 60 and 61 which have an axis of curvature intersecting the axis of shaft 16 at the point 65 shown in Fig. 1. The cylindrical surfaces 61 have an axis of curvature displaced 90° from the axis of the surfaces 60, but both axes intersect the axis of shaft 16 at the point 65.

The two points 58 and 65 are located at equal but at opposite sides from the center of the joint indicated at 68 in Fig. 1. From this it should be evident that with the parts assembled as seen in Fig. 2, each of the two cylindrical surfaces at each slot is most distant from its shaft axis at a point spaced from the joint center.

The rollers 46 and 47 on the trunnion element 26 have integral collars 70 and 71 provided with flat undersurfaces contacting the cylindrical surfaces 55 and 60. Similarly, the rollers 52 and 53 have collars 71 in contact with the cylindrical surfaces 56 and 61. Shifting of the cross into the bisecting position can best be understood in connection with Fig. 1, and in view of the fact that the manner in which this bisecting is obtained is clearly brought out in Ransom application, Serial No. 480,490, filed March 25, 1943, now Patent 2,396,750, it seems unnecessary to go into this in detail here, and general reference to the operation seems sufficient. If the shaft 16 is angled upwardly, for instance, the collars 70 and 71 will maintain tangential contact with the upper surfaces 55 and 60 and the lower surfaces 55 and 60 respectively. For this tangential contact to be maintained, the collars and hence the entire cross must swing about the axis of the trunnion element 27, and this swinging movement occurs through an angle only half as large as the angle through which the shaft is tilted. Fig. 20 in the copending Ransom application, Serial No. 480,490, filed March 25, 1943, and the corresponding parts of the specification in that application bring out the mathematical proof whereby this bisecting occurs through the maintaining of tangential contact between the surfaces. Tilting, therefore, of either shaft and its yoke arms about the joint center in any direction, will cause a shifting of the cross into the bisecting position. If either shaft is tilted about one trunnion axis, then the cross moves about such first trunnion axis. If either shaft is tilted about any other axis passing through the center of the joint, a compound movement of the trunnion elements occurs to secure positioning of the cross in a plane bisecting the angle between the shafts. Hence, if either shaft is rotating relative to the other and the shafts' axes are fixed, the cross will travel in the bisecting plane so as to secure a constant velocity action.

Assembly of the joint can be effected as follows. First the spherical element 40 may be placed with two of its flattened sides between the yoke arms 13 and 14, and then by turning the ball about 90°, the spherical surfaces on the ball are brought into fitting relation with the surfaces 38 on the two arms. After the ball is thus positioned the trunnion element 27 may be inserted into bore 42. The other yoke arm may then be moved axially so that its yoke arms 18 and 19 move generally over the flat sides of the ball at the ends of bore 43, and after such yoke arms are moved sufficiently they may be turned so as to bring their spherical surfaces into contact with the other spherical surfaces on the ball, it being understood that the arms and ball are so designed and dimensioned to allow this manner of assembly. With the parts as now positioned, the trunnion element 27 may be moved sufficiently to bring the enlarged slot portion 33 therein into a position where the other trunnion element 26 may be inserted, and then after the trunnion elements are brought together in crossing relation as previously described, the rollers may be mounted on the trunnions with the collar surfaces in contact with the cylindrical surfaces on the arms.

The ball element may also be assembled with one yoke as described, and then the other pair of arms on the other yoke may be axially moved over two flattened faces of the ball before inserting the trunnion element 42. In this event the ball could be turned further if desired to facilitate the axial movement of the other arms. Then the latter could be turned into fitting relation to the other spherical ball surfaces and the trunnion elements then inserted. Attention is directed to the fact that the ends of the ball are flattened as indicated at 75 to avoid interference.

In a joint of this type, the rollers act as load or torque conveying elements, and the cross acts to maintain the rollers in the bisecting plane. Only two rollers act as driving or load imparting members at a time, and these are the two in contact with the advance side faces of the driving arms, and which in turn drive the other arms. The pair of rollers which drive depends upon which yoke is driving and the direction of driving, and with the driving axis of the driving rollers held in the bisecting plane, constant velocity results.

Referring to Figs. 6 and 7, the joint illustrated in these figures is similar in many respects to the joint previously described, in that two yokes are provided having arms disposed in spaced relation to provide axially directed slots arranged in 90° spaced relation. The arms on the one yoke are indicated at 81 and 82, and the arms on the other yoke are indicated at 83 and 84. These arms have spherical inner surfaces which cooperate with a spherical interlocking member which is the same as the spherical member 40. The member 40 has the same bores 42 and 43 which intersect each other, and these bores, respectively, receive trunnion elements 84 and 85 having their ends extending outwardly into the four slots between the arms. Such trunnion elements as seen in Fig. 8 are so related as to permit them to move relatively in scissors fashion circumferentially of the joint, and this movement is permitted by providing an elongated slot 86 in element 84 having a width substantially corresponding to the diameter of the trunnion 85. Therefore, the trunnions are held in the same plane but are able to move relatively in this plane as required. It will be recalled that each trunnion element on occasion must move along its own axis and that the two trunnion members must move relative on occasion in scissors fashion, while at the same time being held in the same plane.

The trunnion element 84 has integral heads 87 and 88 on its ends, whereas the trunnion element 85 has an integral head 89 on one end and a threaded opening 90 in its other end. A headed screw 91 is threaded into the opening 90, and the head on this screw corresponds to the integral heads on the trunnion elements, and when in place, all four heads on the trunnion elements perform the same function.

Instead of using rollers on the trunnion elements, each trunnion end of each trunnion element has a pair of shoes 93 and 94 provided respectively with outwardly directed flanges 95 and 96 which extend over outer surface portions of the arms. As best shown by Fig. 6, the flange 95 on the shoe 93 has an inclined undersurface 97 which is directed at an acute angle to the axis of the trunnion or shoe, while the flange 96 on the shoe 94 has an oppositely inclined undersurface 98. These inclined surfaces 97 and 98 have the same angularity relative to the trunnion axis, but they are oppositely directed, and their planes intersect each other on a line which intersects the trunnion axis.

The arm 81 is in contact with two of the shoes 93, the arm 82 on the same yoke as the arm 81 likewise is in contact with two of the shoes 93, the arm 83 is in contact with two of the shoes 94 and the arm 84 on the same yoke as the arm 83 is in contact with two of the shoes 94. Therefore, at each slot, two shoes are provided respectively having opposed inclined surfaces 97 and 98 extending over adjacent surfaces of the arms. The arm 81 has external surfaces 100 and 101 adjacent its two shoes 93—93 and disposed in 90° spaced relation and each of these surfaces defines a curved plane perpendicular to the adjacent side wall of the adjacent slot. The arm 82 has the same surfaces 100 and 101.

The arm 83 has curved surfaces 103 and 104, respectively, perpendicular to the slot side walls and in contact with the inclined surfaces on the flanges of its shoes 94, and similarly the arm 84 has surfaces 103 and 104 in contact with the inclined undersurfaces of its shoes 94. The surfaces 103 and 104 are of the same character, but displaced 90° from each other.

The surfaces 100 and 101 constitute portions of involutes which are oppositely disposed with respect to involutes from which surfaces 103 and 104 are formed. It should be understood that all surfaces on all arms are derived from the same kind of involutes but that the involutes 100 and 101 are spaced 90° from each other about the axis of the yoke upon which they are located while the involutes 103 and 104 are not only spaced 90° from each other about the axis of the yoke on which they are located, but their involutes are opposite to the first involutes. As seen in Fig. 6, the involutes 100 at the top and bottom will have the same relation to the joint center, but will be 180° apart and the involutes 103 will have the same relation to the joint center and will be 180° apart. On the other hand, the involutes 100 and 103 are opposite so that if the involutes 103 were swung 180° about an axis passing through 105 and 106, they would fall on or coincide with the involutes 100. The involutes 101 and 104 have the same relation to each other as the involutes 100 and 103, but are displaced 90° therefrom.

The undersurfaces of the shoes are in contact with these involute surfaces on the arms through a tangential contact. Therefore, as seen in Fig. 6 herein, the shoe 96 has tangential contact with the surface 103, while the shoe 93 has tangential contact with the surface 100. As seen in Fig. 6, the involute surfaces cross at 105 and 106, and these intersection points remain equidistant along the axis of the trunnion during swinging movement of the yoke arms, although it should be realized that the intersections along either trunnion axis may shift together along the axis, or, in other words, the intersection 105 may move outwardly, and at the same time the intersection 106 moves inwardly, and vice versa, depending upon the movements involved. It seems unnecessary to repeat the mathematical proofs showing that the cross shifts into a bisecting plane when either yoke is angled relative to the other, as this is brought out in the Ransom application mentioned.

A characteristic of this form of the invention resides in a simpler construction which is easy to assemble. It will be observed first that one trunnion is integral and that there are no threaded parts on it, while the other trunnion has only one threaded part. In assembling the joint, the spherical element 40 is first assembled with the two yokes as previously described, excepting that neither trunnion element is initially assembled with the spherical element and then by swinging the arms 83 and 84 clockwise, the upper and lower slots, as seen in Fig. 7, may be widened sufficiently to allow the trunnion element 84 to be inserted and the shoes 94 and 95 to be placed in position. Then the arms may be reversely turned so as to bring them into proper contact with the shoes. The shoes at the right end of trunnion 85 may now be placed in position and the threaded end of the trunnion may be moved through these shoes, through the spherical element and through the opening 86 in the other trunnion member until the trunnion element is in proper position. Then the other shoes may be placed in position over the threaded end of the trunnion and finally the head member 81 may be threaded into place.

It may be mentioned finally that the shoes on any trunnion embrace less than the full circumference of the trunnion so as to permit the shoes to move about the trunnion as the arm swings without the shoes contacting with each other. In other words, through a desirable range of angular movement, the shoes carried by the moving arm will not engage the shoes carried by the adjacent arms. This may be effected by cutting away the side edges of the shoe as indicated at 110 and 111 so that they will be in circumferentially separated relation.

Although more than one form of the invention has been illustrated and described in detail, it will be apparent to those skilled in the art that various modifications may be made without departing from the scope of the claims.

What is claimed is:

1. A constant velocity joint comprising a pair of shaft elements, a connecting member on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, movable means in the slots, and means for centering the yokes on a joint center and comprising spherical faces on the radially inner sides of the arms, and a ball element within said surfaces on the arms, said ball having flat sides located respectively at opposing slots between the arms so as to permit assembly of the ball element and arms.

2. A constant velocity joint comprising a pair of shaft elements, a connecting member on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, apertured movable means in the slots, means for centering the yokes on a joint center and comprising spherical faces on the radially inner sides of the arms and a ball element within and fitting said surfaces on the arms and having flat sides located respectively at opposing slots between the arms so as to permit assembly of the ball element and arms, and cross trunnion elements projecting outwardly from the ball and into apertures in the movable means.

3. A constant velocity joint comprising a pair of shaft elements, a connecting member on each shaft element having circumferentially separated arms extending longitudinally of the shaft axis, the arms on one member projecting in a direction axially opposite to the arms of the other with the circumferentially opposite edges of each arm spaced from the adjacent edges of the adjacent arms so that an axially elongated slot is provided between each pair of arms, apertured movable means in the slots, means for centering the yokes on a joint center and comprising spherical faces on the radially inner sides of the arms and a ball element within and fitting said surfaces on the arms and having intersecting openings extending therethrough, and trunnion elements arranged in cross relation extending through the openings in the ball element respectively and into the apertures in the movable means, said openings in the ball elements being such as to allow the trunnion elements to move in scissors fashion so that the outer ends of one element may move circumferentially of the ball relative to the ends of the other element.

4. A constant velocity joint comprising a pair of shaft elements, a connecting member on each shaft element having circumferentially separated arms extending longitudinally of the shaft axis, the arms on one member projecting in a direction axially opposite to the arms on the other with the circumferentially opposite edges of each arm spaced from the adjacent edges of the adjacent arms so that an axially elongated slot is provided between each pair of arms, an intermediate member between the arms and having trunnions respectively projecting radially outwardly into the slots, and means for moving the intermediate member into a plane bisecting the angle between the shafts when one shaft is tilted relative to the other and including surfaces on the arms at circumferentially opposite edges of each with the surfaces on each arm curved longitudinally thereof and a pair of flanged elements carried by the trunnion at each slot and respectively having surfaces located in planes intersecting each other and respectively contacting the arm surfaces at the slot.

5. A constant velocity joint comprising a pair of shaft elements, a connecting member on each shaft element having circumferentially separated arms extending longitudinally of the shaft axis, the arms on one member projecting in a direction axially opposite to the arms on the other with the circumferentially opposite edges of each arm spaced from the adjacent edges of the adjacent arms so that an axially elongated slot is provided between each pair of arms, a pair of relatively movable trunnion members disposed in cross relation and having trunnions on their ends projecting outwardly into the slots, a pair of shoes slidable along each slot and turnably carried by the trunnion therein, flanges on the radially outer ends of the shoes and overlapping the outer surfaces of the arms at the slot, and means holding the shoes on the trunnion against outward movement thereon.

6. A constant velocity joint comprising a pair of shaft elements, a connecting member on each shaft element having circumferentially separated arms extending longitudinally of the shaft axis, the arms on one member projecting in a direction axially opposite to the arms on the other with the circumferentially opposite edges of each arm spaced from the adjacent edges of the adjacent arms so that an axially elongated slot is provided between each pair of arms, a pair of relatively movable trunnion members disposed in cross relation and having trunnions on their ends projecting outwardly into the slots, a pair of shoes slidable along each slot and turnably carried by the trunnion therein, flanges on the radially outer ends of the shoes and overlapping the outer surfaces of the arms at the slot, and means holding the shoes on the trunnion against outward movement thereon, the latter means comprising integral heads on the ends of three trunnions and a removable head on the end of the fourth trunnion.

GEORGE E. DUNN.

REFERENCES CITED

The following references are of record in the file of this patent:

UNITED STATES PATENTS

| Number | Name | Date |
| --- | --- | --- |
| 1,743,901 | Parville | Jan. 14, 1930 |
| 2,156,106 | Bill | Apr. 25, 1939 |
| 2,217,969 | Schairer | Oct. 15, 1940 |
| 2,349,030 | Wingquist | May 16, 1944 |
| 2,396,750 | Ransom | Mar. 19, 1946 |